Dec. 22, 1959 D. E. WIEGAND 2,918,534

COIL-LESS PLAYBACK HEAD

Filed March 26, 1954

Inventor
David E. Wiegand
by Hill, Sherman, Meroni, Gross & Simpson
Attys 2,918,534

COIL-LESS PLAYBACK HEAD

David E. Wiegand, Villa Park, Ill., assignor to Armour Research Foundation of Illinois Institute of Technology, Chicago, Ill.

Application March 26, 1954, Serial No. 418,948

10 Claims. (Cl. 179—100.2)

This invention relates to an electromagnetic transducer device, and particularly to such a device for detecting magnetically recorded signals without the aid of the conventional pickup windings.

It is an object of the present invention to provide a novel electromagnetic transducer device.

It is another object of the present invention to provide a novel coil-less playback head for cooperation with a lengthy magnetized medium.

It is a further object of the present invention to provide a novel playback head of rugged compact construction which may be manufactured with substantial savings over conventional playback heads.

It is a still further object of the present invention to provide a novel method and means for reproducing a recorded signal.

The novel features which I believe to be characteristic of my invention are set forth with particularity in the appended claims. My invention itself, however, both as to its manner of construction and method of operation together with other objects and advantages thereof may be best understood by reference to the following description taken in connection with the accompanying drawings in which:

As shown on the drawings.

Figures 1, 2, 3, 4:
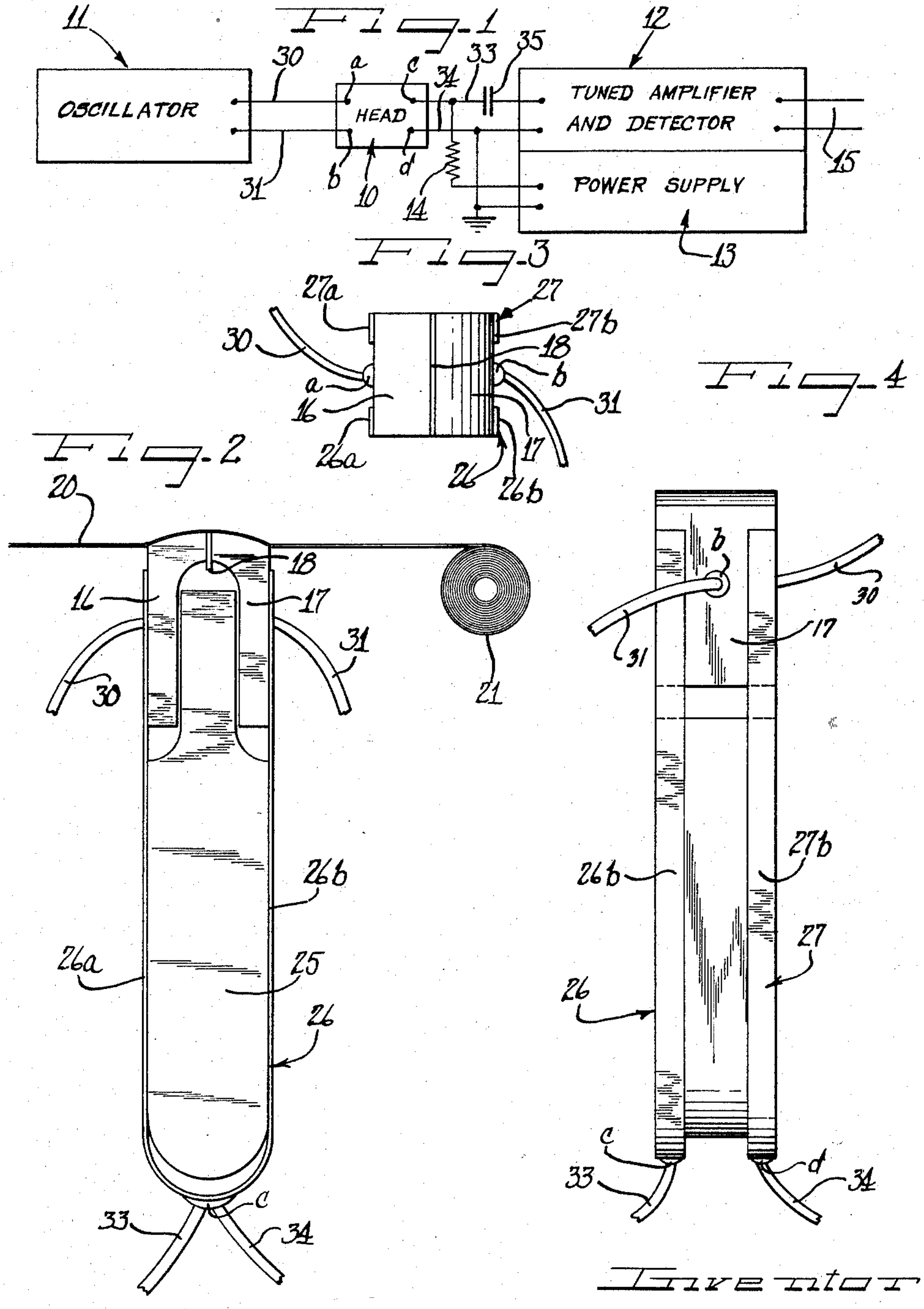
Figure 1 is a diagrammatic illustration of a coil-less playback system according to the present invention.
Figure 2 is a somewhat diagrammatic side elevational view of an electromagnetic transducer device according to the present invention.
Figure 3 is a somewhat diagrammatic top plan view of the structure of Figure 2.
Figure 4 is a somewhat diagrammatic end elevational view of the structure of Figure 2.

It has been found that the permeability of a length of ferromagnetic material depends to a marked degree on the strength of the external field. As a result, changes in the strength of the external field will cause changes in the A.C. resistance and inductance of the sample. This principle is made use of in the coil-less playback head of the present invention. It may be significant to note that the phenomenon used in this head construction is separate and distinct from the Hall effect which yields a change in D.C. resistance with applied magnetic field. The phenomenon in the present head is an A.C. one and results from an interaction of a changing effective permeability and eddy current effects in the material.

In the embodiment illustrated in the drawings, an A.C. bridge network indicated diagrammatically at 10 in Figure 1 is made up entirely of lengths of magnetic material in the head itself. Alternative embodiments would employ only one or two of the bridge elements in the head itself, the other impedance elements being external to the head and adjustable if desired to provide a more precise balanced condition. In the illustrated embodiment a suitable high frequency oscillator indicated diagrammatically at 11 feeds its output into the terminals *a* and *b* of the bridge circuit 10 to be hereinafter described, the output from the terminals *c* and *d* of the bridge circuit being delivered to a suitable amplifier and detector or demodulator indicated diagrammatically at 12 and tuned to twice or some other even multiple of the frequency of the oscillator 11. A power supply 13 is utilized to supply a D.C. polarizing current to the head through a high resistance 14, so as to obtain an output sensitive to differences in polarity of the recorded signal impressed on the head as discussed for the case of a magnetic modulator head in my copending applications Serial Nos. 294,684 and 390,515. A demodulated output is thus obtained at 15 varying in polarity in accordance with the input signal flux. Alternative arrangements of the impedance elements and of the bridge circuit would give useful output that is at oscillator frequency, rather than at a second or higher even order harmonic. Thus, the present description is for purposes of illustration only.

As illustrated in Figures 2, 3 and 4, a playback head according to the present invention may comprise a pair of core pieces 16 and 17 separated by non-magnetic non-conductive spacer 18 which may be of a mica, paper or the like to define a non-magnetic gap for cooperation with a record member 20 moved across the head as by a takeup spool 21. The pole pieces are preferably mounted on a Bakelite backbone 25 and have a pair of strips 26 and 27 with their opposite ends secured to the respective pole pieces to provide a pair of low reluctance magnetic circuits including the gap 18. Electrical terminals are provided at *a* and *b* on the pole pieces 16 and 17, respectively, as indicated in Figures 3 and 4 with leads 30 and 31 connecting with the terminals. Further electric terminals *c* and *d* divide the strips 26 and 27 into pairs of conducting members 26*a*, 26*b*, and 27*a*, 27*b*, the terminals *c* and *d* having leads 33 and 34 connecting therewith. It will be observed from Figure 1 that a blocking condenser 35 is provided to isolate the input of amplifier 12 from the polarizing voltage supplied through resistor 14.

The conducting members 26*a*, 26*b* and 27*a*, 27*b* act as an A.C. bridge. With no external flux into the head and symmetry in the head, the bridge is balanced except for the constant output resulting from the polarizing current from supply 13. When flux from the recording medium 20 enters the head, the A.C. resistance and inductance of the conducting members is varied in accordance with the recorded signal to give a modulated output which is amplified and detected at 12.

Perfect symmetry of the high permeability members 26*a*, 26*b*, 27*a*, 27*b* is not required since a degree of constructional dissymmetry produces only odd harmonic components in the output. Even if odd harmonic components are developed when an external signal flux is applied, the head and amplifier should still respond properly to the signal providing only that the amplifier is tuned sufficiently sharply to the desired even harmonic and is not overloaded by the odd harmonic components.

It has been found that the oscillator 11 may be connected to terminals *c*, *d* of the head with the output taken from terminals *a*, *b* and a useful output still obtained. Various adaptations of the illustrated embodiment can be made for skew, lateral, transverse, or boundary displacement type recordings.

It will be understood that modifications and variations may be effected without departing from the scope of the novel concepts of the present invention.

I claim as my invention:

1. An electromagnetic playback device comprising an electrically conductive magnetic material, means for supplying an electric current to said material during reproduction of a signal on a magnetized record medium, means connected to said material for receiving a magnetized record medium for establishing a magnetic field in said material, and means coupled to said material for electrically sensing the effect of said magnetic field on said electric current.

2. An electromagnetic playback device comprising a longitudinally elongated electrically conductive member of magnetic material, a magnetic circuit including said member and having a non-magnetic gap for coupling the circuit to a flux source to establish a magnetic signal flux longitudinally in said member, means for establishing an electric current longitudinally in said member, and means coupled to said member for electrically sensing the effect of said magnetic signal flux on said member.

3. An electromagnetic transducer device comprising an electrically conductive member of magnetic material, means for establishing an alternating current in said member, means in magnetic circuit relation with said member for receiving a magnetized record medium for establishing a magnetic field in said member, and means for electrically sensing the change in said electric current due to said magnetic field.

4. An electromagnetic transducer device comprising an electrically conductive member of magnetic material, a magnetic circuit including said member and having a non-magnetic gap for establishing a magnetic signal flux in said member, means for establishing a high frequency current in said member, and means for electrically sensing the effect of said magnetic signal flux on said current.

5. An electromagnetic transducer device comprising an electrically conductive magnetic material, a magnetic circuit including said material and having a non-magnetic signal gap for establishing a magnetic signal flux in said material, means for establishing an alternating electric current in said material flowing generally parallel to the path of said signal flux in said material, and a bridge circuit including said material for electrically sensing the effect of said signal flux in said material.

6. An electromagnetic transducer device comprising an electrically conductive member of magnetic material, means in electrical continuity with said member for establishing a high frequency current in said member, means for establishing a magnetic field in said member varying in accordance with an intelligence signal, and a bridge circuit including said member and energized by said high frequency current for electrically sensing the effect of said magnetic field in said member.

7. An electromagnetic transducer device comprising a magnetic core having a pair of poles defining a non-magnetic non-conductive gap, means defining a loop magnetic circuit including said pole pieces and said non-magnetic gap and further including an electrically conductive magnetic material, means for moving a lengthy magnetized medium across said gap for establishing a signal flux in said magnetic circuit, means for establishing an alternating electric current in said magnetic material flowing generally parallel to the path of said signal flux in said material, and means for sensing the change in effective permeability of said material due to said signal flux.

8. An electromagnetic transducer device comprising a pair of poles of magnetic electrically conductive material defining a non-magnetic non-conductive gap therebetween, a pair of loop magnetic circuits including said poles and said non-magnetic gap and each including a member of electrically conductive magnetic material bent to have the opposite free ends of the member in conducting low reluctance relation to the respective poles, electrical conductor means for establishing a bridge circuit including the members, and means for moving a magnetic record member across said gap for developing a signal flux in said members.

9. An electromagnetic transducer device comprising a pair of poles of magnetic electrically conductive material defining a non-magnetic non-conductive gap therebetween, a pair of loop magnetic circuits including said poles and said non-magnetic gap and each including a member of electrically conductive magnetic material bent to have the opposite free ends of the member in conducting low reluctance relation to the respective poles, electrical conductor means for establishing a bridge circuit including the members, and means for moving a magnetic record member across said gap for developing a signal flux in said members, said members each providing two arms of said bridge circuit.

10. An electromagnetic playback device comprising a material providing a path for electrical current and responsive to an applied magnetic field to alter the electrical impedance of said path, means having bidirectional electric contact with said material at each of the opposite ends of said path for producing an electric current flow along said path, a pair of magnetic pole pieces for receiving a magnetized record medium thereacross and having a non-magnetic gap therebetween across which the record medium is operative to establish a magnetomotive force in accordance with the signal recorded on the record medium, means defining a magnetic flux path between said pole pieces including said material whereby a signal flux produced by said record medium alters the electrical impedance of said path for electrical current, and means connected to said material for sensing changes in the electrical impedance thereof to reproduce the signal recorded on said record medium.

References Cited in the file of this patent

UNITED STATES PATENTS

| | | |
|---|---|---|
| 2,496,441 | Camras | Feb. 7, 1950 |
| 2,608,621 | Peterson | Aug. 26, 1952 |
| 2,615,097 | Camras | Oct. 21, 1952 |